(12) United States Patent
Laurens et al.

(10) Patent No.: US 12,240,560 B2
(45) Date of Patent: Mar. 4, 2025

(54) GEAR SHIFT DEVICE AND ASSOCIATED MOBILITY VEHICLE

(71) Applicant: VALEO EMBRAYAGES, Amiens (FR)

(72) Inventors: Christophe Laurens, Saint Quentin Fallavier (FR); Jonathan Caillaud, Saint Quentin Fallavier (FR); Jerome Boulet, Amiens (FR); Nadia Yacoubi, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/283,138

(22) PCT Filed: Feb. 17, 2022

(86) PCT No.: PCT/EP2022/053992
§ 371 (c)(1),
(2) Date: Sep. 20, 2023

(87) PCT Pub. No.: WO2022/199954
PCT Pub. Date: Sep. 29, 2022

(65) Prior Publication Data
US 2024/0174324 A1 May 30, 2024

(30) Foreign Application Priority Data
Mar. 21, 2021 (FR) .................................. 2102809

(51) Int. Cl.
*B62M 11/06* (2006.01)
*B62M 25/08* (2006.01)
*B62M 6/55* (2010.01)

(52) U.S. Cl.
CPC ............ *B62M 11/06* (2013.01); *B62M 25/08* (2013.01); *B62M 6/55* (2013.01)

(58) Field of Classification Search
CPC .......... B62M 6/55; F16D 41/30; F16H 3/083; F16H 31/005
See application file for complete search history.

(56) References Cited

U.S. PATENT DOCUMENTS

| 5,924,950 A | 7/1999 | Pusic | |
| 6,978,692 B2 * | 12/2005 | Thery | ..................... F16D 21/04 |
| | | | 74/372 |
| 8,628,447 B2 * | 1/2014 | Schmitz | .................. F16H 3/083 |
| | | | 475/330 |

FOREIGN PATENT DOCUMENTS

| DE | 102017008376 B3 * | 3/2018 | ............ B62M 11/06 |
| FR | 2805587 A1 * | 8/2001 | ............. F16H 3/006 |

(Continued)

OTHER PUBLICATIONS

International Search Report and Written Opinion in corresponding International Application No. PCT/EP2022/053992, dated May 3, 2022 (15 pages).

*Primary Examiner* — Bobby Rushing, Jr.
(74) *Attorney, Agent, or Firm* — Osha Bergman Watanabe & Burton LLP

(57) ABSTRACT

The invention relates to a gear shift device for a mobility vehicle, comprising: —a selection shaft in which a shuttle and a worm are arranged, —at least two input pinions arranged to rotate freely about the selection shaft, —at least two output pinions coupled in rotation with a hollow shaft, —a gear shift actuator arranged to move the shuttle along the worm between at least two positions, and to engage a selected gear ratio, —at least two pawls arranged on the selection shaft, each pawl being associated with a lifting device for lifting the pawl via the shuttle, and to engage the gear ratio selected via the input and output pinions, the (Continued)

Figure 1:
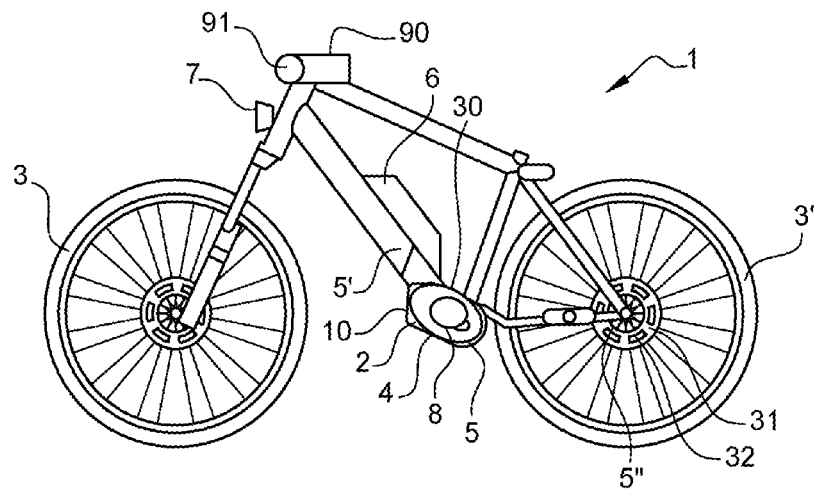

device comprising a radial blocking system, which is formed in one piece, for keeping all the pawls in place on the selection shaft.

8 Claims, 4 Drawing Sheets

(56) References Cited

FOREIGN PATENT DOCUMENTS

| | | |
|---|---|---|
| FR | 2865784 A1 | 8/2005 |
| FR | 2975367 A1 | 11/2012 |
| WO | 2020174025 A1 | 9/2020 |

* cited by examiner

GEAR SHIFT DEVICE AND ASSOCIATED MOBILITY VEHICLE

The present invention relates to the field of gearshift devices and more particularly to a gearshift device for a mobility vehicle using at least electrical propulsion and, for example, to an electrically assisted bicycle.

When a mobility vehicle is in operation, a motive force is transmitted to the wheels via a crank system turning about an axis of a crankset that drives the rear wheel, generally via a chain. Gearboxes for mobility vehicles are already known from the prior art. For example, patent application FR2975367 A1 discloses a gearshift device for bicycles that has a gearbox and a sliding shuttle for selecting the gear. The axial displacement of the shuttle is controlled via two cables connected to a rotary handgrip positioned on the bicycle handlebar. This system requires many parts. It is complex to manufacture and maintain. In particular, the cable control requires precise and regular adjustment. There is a need to simplify and automate gearboxes for cycles.

For that reason, the present invention proposes a gearshift device for a mobility vehicle, comprising:
- a selection shaft in which there are housed a shuttle and a worm,
- at least two input pinions configured so as to turn freely around the selection shaft,
- at least two output pinions that rotate as one with a hollow shaft,
- a gearshift actuator arranged so as to displace the shuttle along the worm between at least two positions and to engage a selected gear,
- at least two pawls positioned at the selection shaft, each pawl being associated with a lifter device allowing the pawl to be lifted by the shuttle and engage the gear selected via the input and output pinions, the device also comprising a radial blocking system, formed as a single piece, to hold all of the pawls in place on the selection shaft.

The radial blocking system thus formed as a single piece is easier to manufacture and to fit and its costs are also reduced.

According to one embodiment of the invention, the blocking system is formed of a longitudinal flat part from which there extend at least two tabs, each of the tabs being positioned above one of the pawls.

According to one embodiment of the invention, the tabs are formed starting from a first edge, parallel to the axis of the blocking system, of the flat part and are oriented perpendicular to the axis of the blocking system.

According to one embodiment of the invention, the flat part is inserted, via a second edge, opposite to the edge at which the tabs are situated, into a longitudinal slot formed in the selection shaft.

According to one embodiment of the invention, the second edge is bent over toward the shaft so as to be inserted into the slot.

According to one embodiment of the invention, each pawl comprises a recess the shape of which complements that of the tab so that the tab is housed in the recess.

According to one embodiment of the invention, the gearshift device comprises seven input pinions and output pinions, seven pawls and seven tabs.

According to one embodiment of the invention, the blocking system comprises a positioning tab.

The invention also relates to a mobility vehicle, notably an electrically assisted mobility vehicle, having a gearshift device according to the invention.

According to one embodiment of the invention, the vehicle is an electrically assisted bicycle.

Figure 2:
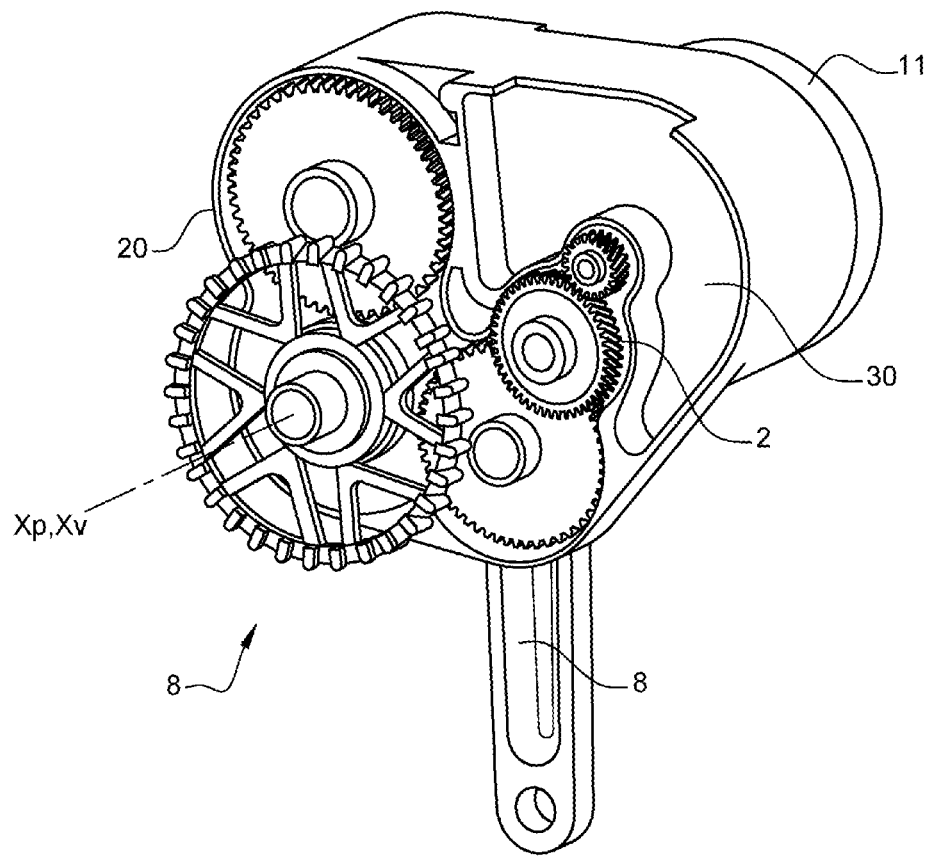
Figure 3A:
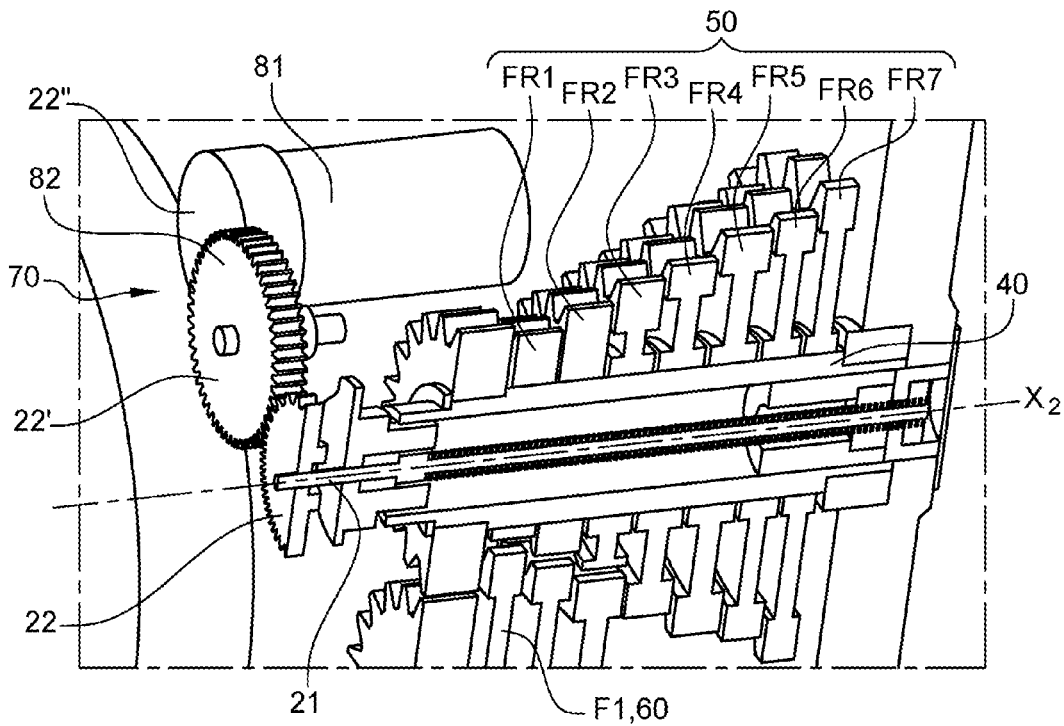
Figure 3B:
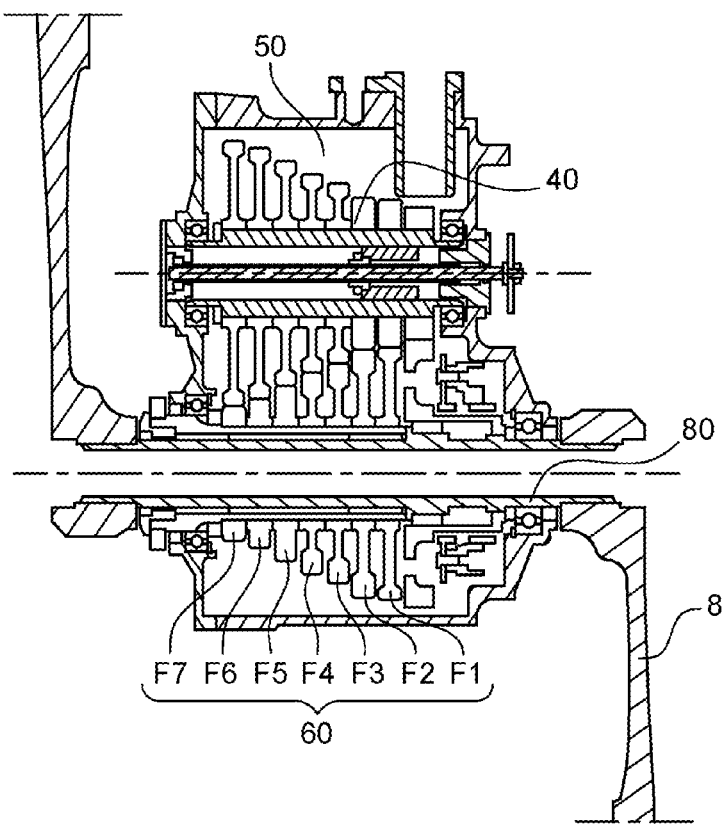
Figure 4:
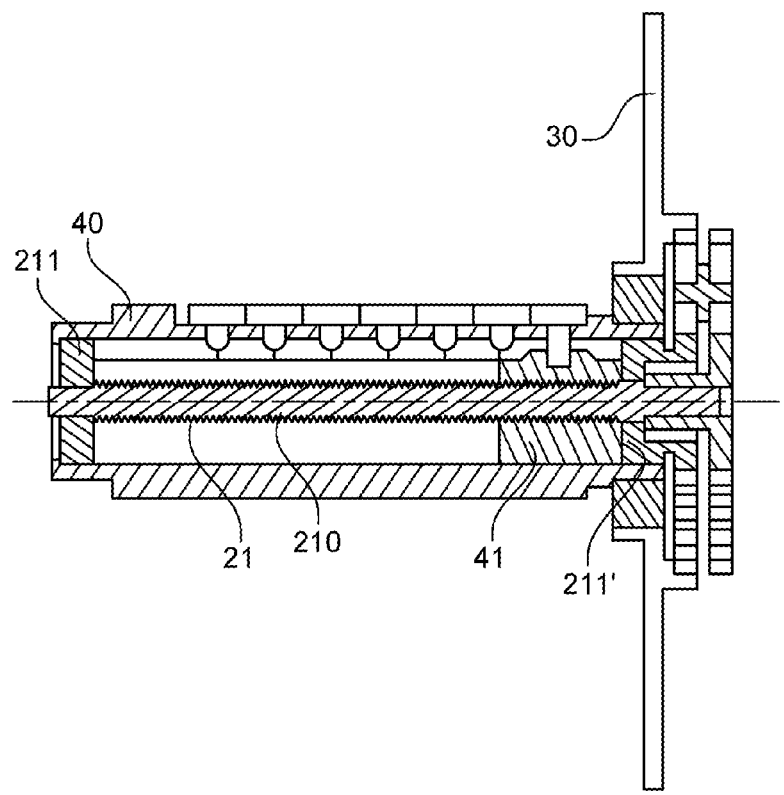
Figure 5:
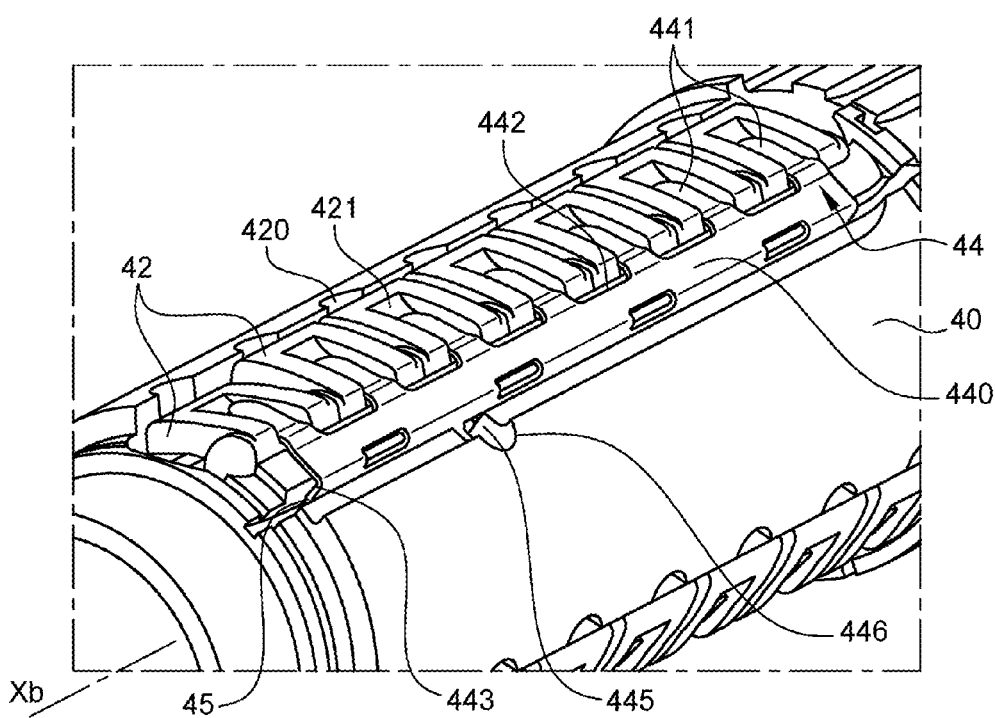
Figure 6:
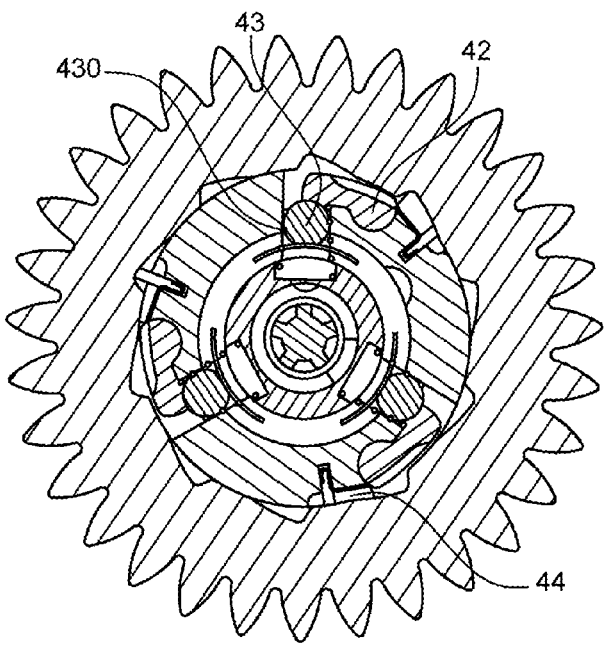
Figure 7:
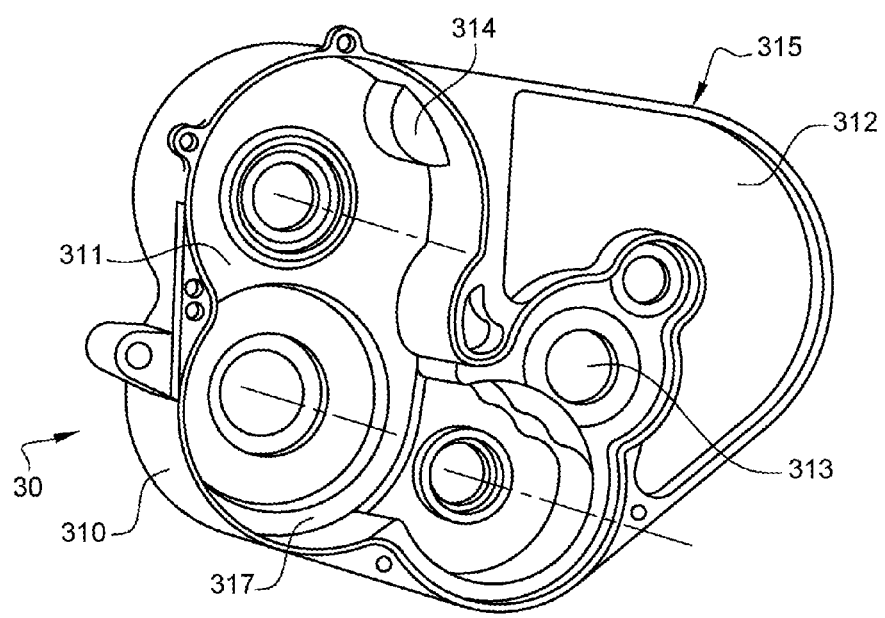

Further aims, features and advantages of the invention will be understood better and will become more clearly apparent from reading the description given below with reference to the appended figures, which are given by way of example and in which:

FIG. 1 is a view of a mobility vehicle according to one of the aspects of the invention, FIG. 2 illustrates the transmission assembly of the mobility vehicle of FIG. 1, FIGS. 3a and 3b illustrate a view in cross section of part of the transmission assembly a) and of the transmission assembly b), FIG. 4 is a view in cross section of a gearshift device according to the invention, FIG. 5 is a view in cross section of part of the gearshift device with a blocking system according to the invention, FIG. 6 is a view in cross section of part of the gearshift device with the blocking system according to the invention, FIG. 7 is a view in cross section of the inside of the housing incorporating part of the transmission assembly according to the invention.

FIG. 1 illustrates a mobility vehicle 1 according to one of the aspects of the invention. The vehicle 1 here is an electrically assisted bicycle comprising an electric motor 2. The electric motor 2 is designed to provide some of the propulsion of the vehicle.

The bicycle comprises at least two wheels 3, 3' to which a motive force is supplied via two pedals turning about an axis of a crankset of axis Xp which drives the rear wheel, for example via a chain, or any other transmission means during its use.

The vehicle 1 also comprises a control unit 4 and a plurality of sensors 5, 5', 5", situated for example at the crankset, on the frame of the bicycle or at a wheel 3, 3'.

The vehicle 1 shown here also comprises an energy storage device in the form of a battery 6, a lighting system 7, a crankset 8 of axis Xp, a location and/or navigation system 90 and a human-machine interface system 91 notably comprising a touchscreen able to display information for and/or to take into account the requirements of said user. The human-machine interface system 91 is in particular connected to the location system 90 and serves as navigation interface. The invention is not limited to a particular human-machine interface system, and can comprise any system known to a person skilled in the art.

The wheels 3, 3' are provided with a brake system 31, notably comprising disk brakes 32.

The vehicle 1 has a transmission assembly 10, illustrated in FIG. 2. The transmission assembly 10 has a gearshift device 20 according to the invention and the electric motor 2 for supplying some of the power for propelling the vehicle 1.

According to one embodiment of the invention, the transmission assembly 10 is at least in part housed in a housing 30 (illustrated in FIG. 7) here positioned at the crankset 8, the axis Xp of which is coincident with the output axis $X_v$ of the gearshift device 20.

According to one embodiment of the invention, the gearshift device 20 illustrated in FIGS. 3a and 3b has at least 2 gear ratios, and for example 7 gear ratios between a first ratio called 1st gear and a higher gear ratio called 7th gear.

According to one embodiment of the invention, the gearshift device 20 comprises a series of seven output pinions 60 of axis $X_v$, namely pinions referenced $F_1$ to $F_7$, rotating as one with a hollow shaft 80, and a series of seven input pinions 50, namely pinions referenced $Fr_1$ to $Fr_7$, designed to turn freely about a selection shaft 40.

According to one embodiment of the invention, the selection shaft 40 illustrated in FIG. 3 and FIG. 4 houses a shuttle 41 surrounding a worm 21 of the gearshift device 20.

According to one variant of the invention, the gearshift device 20 comprises a planetary gearset.

The vehicle 1 according to the invention comprises a gearshift actuator 70 designed to move the shuttle 41 along the worm 21 by a helical kinematic connection, between at least 2 positions and for example between 7 positions from $P_1$ to $P_7$ and to engage a selected gear ratio.

According to one embodiment of the invention, the selection shaft 40 is hollow.

According to one embodiment of the invention, the gearshift actuator 70 comprises electrical means for moving the shuttle 41, in the form of a reduction gearset. This reduction gearset comprises a motor 81 and a reducer 82.

According to one embodiment of the invention, the reduction gearset also comprises a pinion 22 on the axis of the worm 21, an intermediate pinion 22' and a pinion 22''' on the axis of the motor 81. The toothsets of the pinions 22, 22', 22" can be straight-cut teeth as illustrated or helical teeth in a variant which is not illustrated.

The rotational guidance of the worm 21 is, for example, ensured by means of rolling bearings at each of its ends.

According to one embodiment of the invention, the shuttle 41 is configured such that, during its movement, it is positioned below the pinion of the selected gear ratio and engages this gear ratio.

According to one embodiment of the invention, the shuttle 41 is configured like the one described in application FR2975367.

According to one embodiment of the invention, the reduction gearset comprises pinions having parallel axes as illustrated in FIG. 3 or with perpendicular axes.

According to one embodiment of the invention, the gearshift actuator 70 comprises a bevel gearset, straight-cut spur gearset or a helical gearset and/or has one or more stages.

According to one variant embodiment of the invention, the gearshift actuator 70 has a belt or a chain or a universal joint.

According to one embodiment of the invention, illustrated in FIG. 5 and FIG. 6, the gearshift device 20 comprises, at the selection shaft 40, at least two pawls 42 and, for example, for a 1 to 7-speed vehicle, comprises seven pawls 42.

According to one embodiment of the invention, the gearshift device 20 comprises a series of seven pawls positioned one after the other along the longitudinal axis X2 of the selection shaft 40.

According to one embodiment of the invention, the gearshift device 20 comprises at least one series of at least seven pawls positioned one after the other along the longitudinal axis X2 of the selection shaft 40.

According to one embodiment of the invention, the gearshift device 20 comprises three series of at least seven pawls positioned one after the other along the longitudinal axis X2 of the selection shaft 40. The series being spaced 120 degrees from one another about the selection shaft 40.

The pawls 42 have a shape configured to collaborate with the input pinions Fri. The pawls 42 are housed in recesses 420 formed on the selection shaft 40. Each pawl 42 is associated with a lifter device, and for example a ball 43, visible in FIG. 4 and FIG. 6, housed in a drilling 430 in the inner shaft and protruding into the inside of the inner shaft, and positioned beneath each pawl 42 so as to be able to lift it via the shuttle 41.

When the gear is selected, the shuttle 41 is positioned beneath the input pinion Fr corresponding to the gear ratio i selected, which is then prevented from rotating by one of the pawls 42 and meshes with the corresponding output pinion.

In the context of the invention, in order to hold the pawls 42 in place in their housing 420, the gearshift system comprises at least one radial blocking system 44 formed as a single piece. What that means to say is a system 44 that keeps the pawls 42 pressed into their housing, while at the same time allowing them to be lifted by the ball 43 and the shuttle 41. The radial blocking system 44 is formed in one piece. That makes it easier to fit and to manufacture and limits costs According to one embodiment of the invention, the blocking system 44 comprises a longitudinal flat part 440.

According to one embodiment of the invention, the system 44 comprises at least two tabs 441, and for example seven tabs 441 in the case of a seven-speed vehicle.

According to one embodiment of the invention, the tabs 441 are formed starting from a first edge 442, parallel to the axis Xb of the blocking system 44, of the flat part 440 and are oriented perpendicular to the axis Xb of the blocking system 44. The rotational-blocking system 44 thus forms a comb with flattened and separated teeth.

According to one embodiment of the invention, the flat part 440 is inserted, via a second edge 443, opposite to the edge 442 at which the tabs 441 are situated, into a longitudinal slot 45, parallel to the axis of the shaft, formed in the selection shaft 40.

According to one embodiment of the invention, the second edge 443 is bent over toward the shaft 40 so as to be inserted into the slot 45.

The blocking system 44 is arranged on the selection shaft 40 in such a way that each tab 441 is positioned over a pawl 42.

According to one embodiment of the invention, each pawl 42 comprises a recess 421 the shape of which complements that of the tab 441 so that the tab 441 is housed in the recess 421 and does not move when the pawl is immobilized.

According to one embodiment of the invention, the rotational-blocking system 44 comprises a positioning tab 446. This positioning tab 446 is positioned on the second edge 443 that is inserted into the slot 45. This tab 444 collaborates with an additional housing 445 of a shape that complements that of the positioning tab 446 and that is formed in the selection shaft 40. This positioning tab 446 allows the tabs 441 of the device to be centered over the pawls 42.

The rotational blocking system 44 thus applies to each pawl 42 a pressure, or pressing force, that is enough to block the pawl 42 in the housing 421 while allowing it to be lifted by the shuttle 41.

According to one embodiment of the invention, the gearshift system comprises at least three rotational blocking systems 44 positioned in such a way as to block three series of pawls.

The shuttle 41 is able to select the chosen gear ratio and this will engage an input pinion Fri via a pawl 42 and be blocked against rotation by virtue of the rotation blocking system 44.

The input pinion Fri then meshes with an output pinion Fi.

If the vehicle 1 is running in a gear ratio i, without changing gear, the worm 21 does not turn.

During a change of gear ratio, the worm 21 is driven in rotation by the gearshift actuator 70 causing the axial movement of the nut 210 of the worm 21 which drives the shuttle 41 and thus allows the gearshift. The pivot connection thus implemented converts the rotational movement of the worm 21 into the translational movement of the shuttle 41.

According to one embodiment of the invention, a limit stop 211, 211' limits the movement of the shuttle 41 at each end. According to another embodiment of the invention, the movement of the shuttle is controlled by a position sensor.

In an embodiment which has not been illustrated, the shuttle 41 can adopt a position referred to as the neutral position P0 in which no gear ratio is engaged.

FIG. 7 illustrates the casing 30 of the mobility vehicle 1 of FIG. 1 in more detail.

The casing 30 has a case 310 that delimits a first housing 311 arranged so as to accommodate the gearsets of the gearshift device 20. The casing 310 also delimits at least two second housings 312, 313, 314, 315, that are separate from one another. These housings are together configured so as to accommodate respectively the electric motor 2, the reduction gearset 11, the gearshift actuator 70 and the control unit 4 of the mobility vehicle. According to one embodiment of the invention, at least a second housing is fluidtight and for example is the one intended to contain the control unit 4.

According to one embodiment of the invention, the casing 310 housing the gearshift device 20 is closed by two lateral flanges 317, just one of which has been illustrated in FIG. 4. The first housing 311 has two facing holes in the lateral flanges 317 for receiving the crankset spindle of the mobility vehicle 1.

The scope of the present invention is not limited to the details given above and allows embodiments in numerous other specific forms without moving away from the field of application of the invention. Consequently, the present embodiments should be considered to be by way of illustration, and can be modified without, however, departing from the scope defined by the claims.

The invention claimed is:

1. A gearshift device for a mobility vehicle, comprising:
    a selection shaft in which there are housed a shuttle and a worm,
    at least two input pinions configured so as to turn freely around the selection shaft,
    at least two output pinions that rotate as one with a hollow shaft,
    a gearshift actuator arranged so as to displace the shuttle along the worm between at least two positions and to engage a selected gear,
    at least two pawls positioned at the selection shaft, each pawl being associated with a lifter device allowing the pawl to be lifted by the shuttle and engage the gear selected via the input and output pinions,
    wherein the gearshift device also comprises a radial blocking system, formed as a single piece, to hold all of the pawls in place on the selection shaft,
    wherein the blocking system is formed of a longitudinal flat part from which there extend at least two tabs, each of the at least two tabs being positioned above one of the pawls, and
    wherein the longitudinal flat part is inserted, via an edge opposite to an edge at which the tabs are situated, into a longitudinal slot formed in the selection shaft.

2. The gearshift device as claimed in claim 1, wherein the tabs are formed starting from a first edge, parallel to the axis of the blocking system, of the flat part and are oriented perpendicular to the axis of the blocking system.

3. The gearshift device as claimed in claim 1, wherein the second edge is bent over toward the shaft so as to be inserted into the slot.

4. The gearshift device as claimed in claim 1, wherein each pawl comprises a recess the shape of which complements that of the tab so that the tab is housed in the recess.

5. The gearshift device as claimed in claim 1, comprising seven input pinions, seven output pinions, seven pawls and seven tabs.

6. The gearshift device as claimed in claim 1, wherein the radial blocking system comprises a positioning tab.

7. A mobility vehicle, comprising a gearshift device as claimed in claim 1.

8. The mobility vehicle as claimed in claim 7, wherein the vehicle is an electrically assisted bicycle.

* * * * *